(12) United States Patent
Liu et al.

(10) Patent No.: US 11,349,600 B2
(45) Date of Patent: May 31, 2022

(54) OPTIMIZING DELAY-SENSITIVE NETWORK-BASED COMMUNICATIONS WITH LATENCY GUIDANCE

(71) Applicant: AT&T Intellectual Property I, L.P., Atlanta, GA (US)

(72) Inventors: Zhengye Liu, Pleasanton, CA (US); Xidong Wu, San Ramon, CA (US); Jin Wang, Fremont, CA (US); Bo Han, Bridgewater, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/068,795

(22) Filed: Oct. 12, 2020

(65) Prior Publication Data

US 2021/0028884 A1 Jan. 28, 2021

Related U.S. Application Data

(63) Continuation of application No. 16/284,936, filed on Feb. 25, 2019, now Pat. No. 10,805,044.

(51) Int. Cl.

| H04L 1/00 | (2006.01) |
|---|---|
| H04L 1/18 | (2006.01) |
| H04L 1/08 | (2006.01) |
| H04L 12/26 | (2006.01) |
| H04L 43/0852 | (2022.01) |
| H04L 43/0829 | (2022.01) |

(52) U.S. Cl.
CPC .............. *H04L 1/0042* (2013.01); *H04L 1/08* (2013.01); *H04L 1/1812* (2013.01); *H04L 43/0829* (2013.01); *H04L 43/0852* (2013.01)

(58) Field of Classification Search
CPC ....... H04L 1/0042; H04L 1/08; H04L 1/1812; H04L 43/0829; H04L 43/0852
See application file for complete search history.

(56) References Cited

U.S. PATENT DOCUMENTS

| 7,940,777 B2 | 5/2011 | Asati et al. |
|---|---|---|
| 8,228,800 B2 | 7/2012 | Mehrotra et al. |
| 8,738,986 B2 | 5/2014 | Srinivas et al. |
| 9,084,169 B2 | 7/2015 | Cui et al. |
| 9,191,158 B2 | 11/2015 | Gondo et al. |
| 9,380,094 B2 | 6/2016 | Florencio et al. |
| 9,426,517 B2 | 8/2016 | Kozat |
| 9,438,483 B2 | 9/2016 | Anschutz |
| 9,608,768 B2 | 3/2017 | Liu et al. |

(Continued)

*Primary Examiner* — Kyle Vallecillo

(57) ABSTRACT

Devices, computer-readable media, and methods for selecting a type of packet loss protection for a network-based communication based upon a latency estimate are disclosed. For example, a processing system including at least one processor may obtain a latency estimate for a network-based communication, determine whether the latency estimate exceeds a latency threshold for selecting a type of packet loss protection, and select, the type of packet loss protection for the network-based communication from among a first type of packet loss protection and a second type of packet loss protection based upon the determining. When the latency estimate is determined to not exceed the latency threshold, the first type of packet loss protection is selected. When the latency estimate is determined to exceed the latency threshold, the second type of packet loss protection is selected.

18 Claims, 5 Drawing Sheets

(56) References Cited

U.S. PATENT DOCUMENTS

| | | |
|---|---|---|
| 9,674,057 B2 | 6/2017 | Begwani et al. |
| 9,736,457 B2 | 8/2017 | Hines et al. |
| 9,781,488 B2 | 10/2017 | Rozenberg et al. |
| 9,973,215 B1 | 5/2018 | Sivakumar et al. |
| 10,069,595 B2 | 9/2018 | Zahemszky et al. |
| 2006/0209837 A1 | 9/2006 | Lee et al. |
| 2016/0249069 A1 | 8/2016 | Ryu et al. |
| 2018/0254982 A1 | 9/2018 | Apostolopoulos et al. |
| 2019/0028231 A1 | 1/2019 | Wang et al. |
| 2019/0158251 A1* | 5/2019 | Park .................. H04L 5/0055 |
| 2019/0200368 A1* | 6/2019 | Omnes ............... H04W 72/087 |
| 2020/0021513 A1 | 1/2020 | Hegde et al. |
| 2021/0022031 A1* | 1/2021 | Liu ................... H04W 28/0236 |

\* cited by examiner

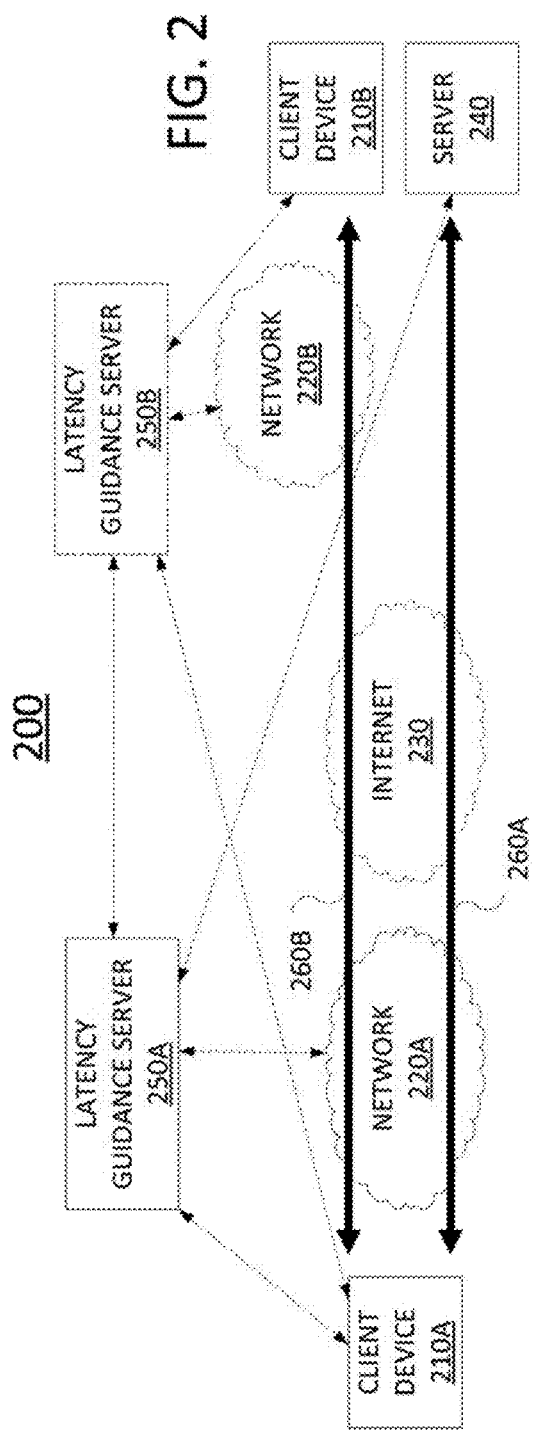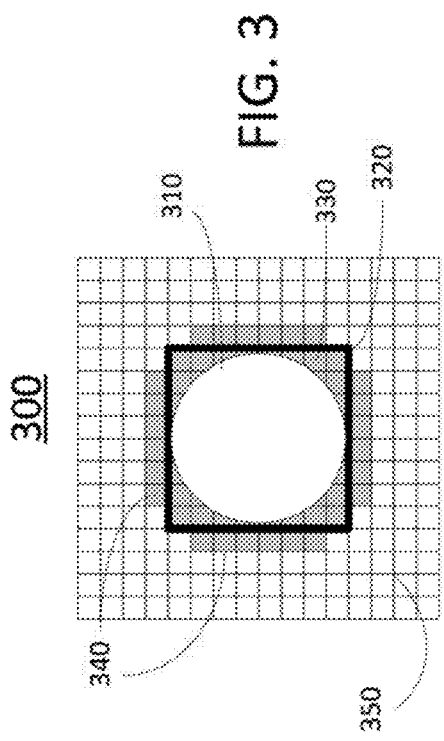

OPTIMIZING DELAY-SENSITIVE NETWORK-BASED COMMUNICATIONS WITH LATENCY GUIDANCE

This application is a continuation of U.S. patent application Ser. No. 16/284,936, filed Feb. 25, 2019, now U.S. Pat. No. 10,805,044, which is herein incorporated by reference in its entirety.

The present disclosure relates generally to optimizing delivery of delay-sensitive network-based communications, such as immersive visual streams, and more particularly to devices, non-transitory computer-readable media, and methods for selecting a type of packet loss protection for a network-based communication based upon a latency estimate, and to devices, non-transitory computer-readable media, and methods for selecting a type of transmission for an immersive visual stream based upon a latency estimate.

BRIEF DESCRIPTION OF THE DRAWINGS

The teachings of the present disclosure can be readily understood by considering the following detailed description in conjunction with the accompanying drawings, in which:

FIG. 2 illustrates an example system in accordance with the present disclosure;

FIG. 3 illustrates an example frame of a visual stream in accordance with the present disclosure;

To facilitate understanding, identical reference numerals have been used, where possible, to designate identical elements that are common to the figures.

DETAILED DESCRIPTION

Figure 1:
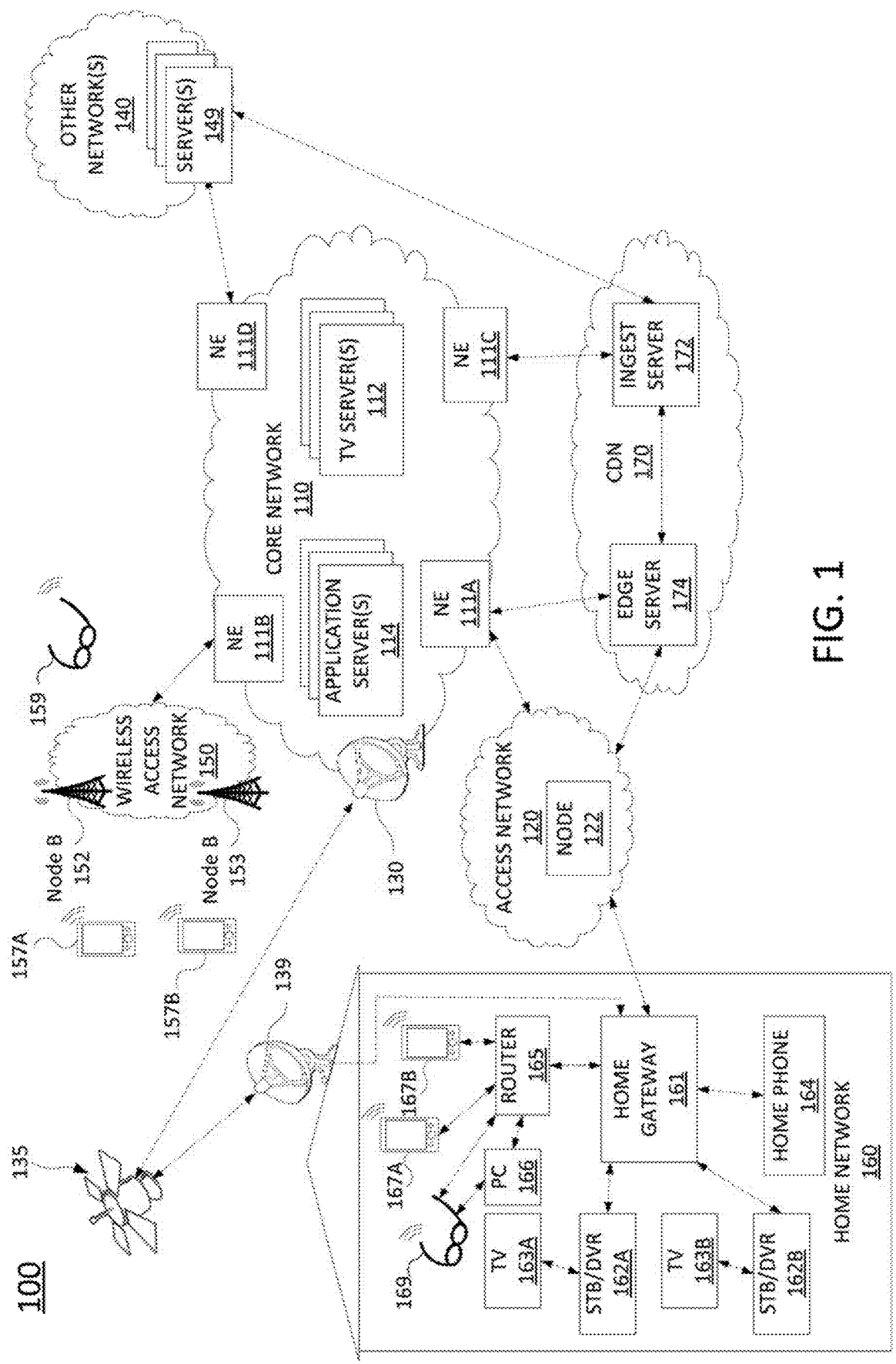
FIG. 1 illustrates an example network related to the present disclosure.

In one example, the present disclosure describes a device, computer-readable medium, and method for selecting a type of packet loss protection for a network-based communication based upon a latency estimate. For instance, a processing system including at least one processor may obtain a latency estimate for a network-based communication, determine whether the latency estimate exceeds a latency threshold for selecting a type of packet loss protection, and select the type of packet loss protection for the network-based communication from among a first type of packet loss protection and a second type of packet loss protection based upon the determining. When the latency estimate is determined to not exceed the latency threshold, the first type of packet loss protection is selected. When the latency estimate is determined to exceed the threshold, the second type of packet loss protection is selected.

In another example, the present disclosure describes a device, computer-readable medium, and method for selecting a type of transmission for an immersive visual stream based upon a latency estimate. For instance, a processing system including at least one processor may obtain a latency estimate for an immersive visual stream, determine whether the latency estimate exceeds a latency threshold for selecting a type of transmission for the immersive visual stream, and select the type of transmission for the immersive visual stream from among a field of view restricted type of transmission and a field of view plus out of scene type of transmission based upon the determining. When the latency estimate is determined to not exceed the latency threshold, the field of view restricted type of transmission is selected. When the latency estimate is determined to exceed the threshold, the field of view plus out of scene type of transmission is selected.

Delay sensitive network-based communications may include video conferencing, cloud-based video gaming, immersive augmented reality (AR) or virtual reality (VR) media, video streaming, e.g., high definition two-dimensional (2D) video, three-dimensional (3D) video, and/or volumetric video, and many more. For such delay sensitive applications, it is beneficial to account for and to minimize, if possible, the end-to-end delay to less than a couple of hundreds of milliseconds, otherwise, the user experience may be degraded. For example with respect to a streaming video application, the end-to-end latency may include video encoding latency, transmission latency, decoding latency, etc. In other words, the end-to-end latency may include a summation of the delays associated with the processes involved in: 1) the obtaining and encoding of the video by a server, e.g., a video server, a conferencing server, or a gaming server; 2) the transport of the encoded video over one or more networks; and 3) the decoding and displaying of the video on a client device. Some of these processes can be controlled and managed from the server side and also from the client side, e.g., the processes running on the server and/or client devices can be properly monitored and controlled. However, there are more uncertainties as to the network components forming the underlying network resources utilized in the forwarding of the video between the server side and the client side. For example, user demands may rise and fall without advance warning and the performance of the underlying network resources is closely tied to such demands. In addition, the Internet may be involved in the transport of the video between the server and the client device. Since the Internet is a best effort network, network dynamics, including bandwidth fluctuation, latency fluctuation, packet losses and jitter are to be expected.

To address network packet loss, an error-correcting code (ECC), e.g., forward error correction (FEC), may be applied across n application layer source video packets to generate k application layer redundant FEC packets. If the total number of received packets m, including both source packets and redundant packets, is larger than the number of original source video packets n, the lost packets can be fully recovered. It may (or may not) introduce certain encoding delay, but it in general does not introduce much transmission delay. Thus the advantage of application layer FEC is that it does not introduce much additional delay and the additional delay is largely configurable and deterministic. Furthermore, the packet loss rate that it can handle is also configurable and deterministic. The disadvantage of application layer FEC is that it may waste bandwidth and its performance depends on the packet loss rate, as (1) if there are less packet losses than redundant FEC packets, certain redundant FEC packets will be wasted; and more importantly (2) if the number of lost packets is higher than the number of redundant FEC packets, application layer FEC does not work, and all redundant packets are wasted.

Similarly, a retransmission scheme may be applied to address network packet loss. In this case, if a packet is lost, a client may request that a server retransmit a lost packet. It does not introduce much overhead and uses bandwidth more efficiently. However, if the end-to-end latency is too long, the retransmitted packet may miss the decoding and display deadline, inducing degraded visual quality of experience (QoE). For instance, the client device 210A may maintain a shallow buffer for receiving and assembling packets, where the buffer depth may be set such that media (e.g., video frames, audio frames, etc.) is played-out without perceptible delay to a user.

In one example of the present disclosure, latency guidance is used to adapt delay sensitive network-based applications to select different types of packet loss protection schemes. The adaptation is not limited to the two above-listed schemes and other schemes can be evaluated and selected, such as an automatic repeat request (ARQ) scheme, a hybrid automatic repeat request (HARQ) scheme, a redundant stream scheme, and so forth. However, for illustrative purposes, the present examples are described primarily in connection with an error-correcting code, e.g., FEC, and retransmission schemes. It is again noted that application layer FEC is latency friendly but it is less bandwidth efficient; while retransmission is bandwidth efficient but it is less latency friendly. In one example, if latency guidance predicts the near-term latency will be low (e.g., below a threshold, such as under 200 ms for VR or 3D video streaming), a retransmission-based scheme may be selected. Otherwise, application layer FEC may be selected.

In addition, for immersive visual streaming, such as 3D video, 360 video, volumetric video, VR or AR media, e.g., for 3D gaming, remote surgery, or other applications, and so forth, in one example of the present disclosure, latency guidance is used to adapt delay sensitive network-based applications to select different types of transmission. To illustrate, immersive video, e.g., 360 degree video, three dimensional (3D) video, volumetric video, and so forth may be captured by multiple video cameras, video stitched, compressed, and streamed to user devices for decoding and display. To provide an immersive watching experience, a resolution of 4K or higher after video stitching may be considered a minimum acceptable frame resolution, while 8K resolution or higher may be preferred. The according video bitrate can be as high as tens to hundreds of Mbps. However, wireless spectrum and network bandwidth may be limited (and costly), especially with predicted millions of users streaming 360/3D videos over the Internet simultaneously.

In one example, an immersive video frame may include a field-of-view (FoV), e.g., the viewing area in a stitched image, and a non-FoV, e.g., regions which are available but not currently visible to a user or presented via a display. One approach is to transmit the entire frame (e.g., the entire image of the frame), including both of the FoV and the rest of the image. In this way, no matter how a viewer changes the FoV, the viewer can immediately view this FoV, as the entire image is transmitted. However, since for a certain time the viewer only views the FoV, the bandwidth used to deliver data relating to non-FoV regions is wasted. Another approach is that only data relating to the FoV is transmitted (broadly "FoV restricted"). This approach may effectively reduce the network bandwidth utilization. However, FoV prediction may be difficult to achieve. In addition, without accurate FOV prediction, buffered data at a client/user endpoint device for the predicted FoV is wasted. More importantly, if the visual data of the actual FoV cannot be received in a very short time (in the scale of several ms), the image will be frozen and QoE will be degraded. Another approach involves two-tier video quality transmission, where a full frame/image of lower quality is always transmitted, while data for rendering a higher visual quality for the FoV is transmitted based on FoV prediction. In this way, even if the predicted FoV is wrong, there is still a lower quality visual data for any actual FoV.

In one example of the present disclosure, a network latency prediction is used to select a more aggressive or less aggressive transmission. For instance, if the predicted network latency is lower than a certain threshold (e.g., 20 ms), a more aggressive video transmission schedule is selected. For example, in this scenario, only visual data for the predicted FoV area is transmitted. When the FoV prediction is wrong, the client device may retrieve the visual data for the actual FoV area from the server. Since latency is low (e.g., less than 20 ms), it is expected that these bytes can be received before any QoE degradation can be observed.

On the other hand, if the predicted network latency is higher than a certain threshold (e.g., 20 ms), a more conservative video transmission schedule is selected. For example, in this scenario, an image of 360 degree video, volumetric video, or the like can be encoded into two-tiers (or layers with layered video), where the FoV area is encoded and transmitted with high quality video while non-FoV area is encoded and transmitted with low quality video. As it is predicted that latency is high, low quality video of the non-FoV area is used to provide basic visual quality when the actual FoV area has not been received.

Thus, examples of the present disclosure, including both for selecting a type of packet loss protection for a network-based communication based upon a latency estimate and for selecting a type of transmission for an immersive visual stream based upon a latency estimate may achieve network bandwidth savings when possible in connection with low latency scenarios, while avoiding QoE degradation when latency is high by adapting to different packet loss protection schemes or types of transmission. These and other aspects of the present disclosure are described in greater detail below in connection with the examples of FIGS. 1-6.

To better understand the present disclosure, FIG. 1 illustrates an example network 100, related to the present disclosure. As shown in FIG. 1, the network 100 connects mobile devices 157A, 157B, 159, 167A, 167B, and 169, and home network devices such as home gateway 161, set-top boxes (STBs) 162A and 162B, television (TV) 163A and TV 163B, home phone 164, router 165, personal computer (PC) 166, and so forth, with one another and with various other devices via a core network 110, a wireless access network 150 (e.g., a cellular network), an access network 120, other networks 140, content distribution network (CDN) 170, and/or the Internet in general. For instance, connections between core network 110, access network 120, home network 160, CDN 170, wireless access network 150 and other networks 140 may comprise the Internet in general, internal links under the control of single telecommunication service provider network, links between peer networks, and so forth.

In one example, wireless access network 150 comprises a radio access network implementing such technologies as: Global System for Mobile Communication (GSM), e.g., a Base Station Subsystem (BSS), or IS-95, a Universal Mobile Telecommunications System (UMTS) network employing Wideband Code Division Multiple Access (WCDMA), or a CDMA3000 network, among others. In other words, wireless access network 150 may comprise an access network in accordance with any "second generation" (2G), "third generation" (3G), "fourth generation" (4G), Long Term Evolution (LTE) or any other yet to be developed future wireless/cellular network technology. While the present disclosure is not limited to any particular type of wireless access network, in the illustrative example, wireless access network 150 is shown as a UMTS terrestrial radio access network (UTRAN) subsystem. Thus, elements 152 and 153 may each comprise a Node B or evolved Node B (eNodeB). In one example, wireless access network 150 may be controlled and/or operated by a same entity as core network 110.

In one example, each of mobile devices 157A, 157B, 159, 167A, 167B, and 169 may comprise any subscriber/customer endpoint device configured for wireless communication such as a laptop computer, a Wi-Fi device, a Personal Digital Assistant (PDA), a mobile phone, a smartphone, an email device, a computing tablet, a messaging device, a wearable computing device (e.g., smart glasses, augmented reality glasses, or a headset), a wireless speaker and/or smart speaker, a digital voice assistant device, and the like. In one example, any one or more of mobile devices 157A, 157B, 159, 167A, 167B, and 169 may have both cellular and non-cellular access capabilities and may further have wired communication and networking capabilities.

As illustrated in FIG. 1, network 100 includes a core network 110. In one example, core network 110 may combine core network components of a cellular network with components of a triple play service network; where triple play services include telephone services, Internet services and television services to subscribers. For example, core network 110 may functionally comprise a fixed mobile convergence (FMC) network, e.g., an IP Multimedia Subsystem (IMS) network. In addition, core network 110 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Core network 110 may also further comprise a broadcast television network, e.g., a traditional cable provider network or an Internet Protocol Television (IPTV) network, as well as an Internet Service Provider (ISP) network. The network elements 111A-111D may serve as gateway servers or edge routers to interconnect the core network 110 with other networks 140, wireless access network 150, access network 120, and so forth. As shown in FIG. 1, core network 110 may also include a plurality of television (TV) servers 112, and a plurality of application servers 114. For ease of illustration, various additional elements of core network 110 are omitted from FIG. 1.

With respect to television service provider functions, core network 110 may include one or more television servers 112 for the delivery of television content, e.g., a broadcast server, a cable head-end, and so forth. For example, core network 110 may comprise a video super hub office, a video hub office and/or a service office/central office. In this regard, television servers 112 may include content server(s) to store scheduled television broadcast content for a number of television channels, video-on-demand programming, local programming content, and so forth. Alternatively, or in addition, content providers may stream various contents to the core network 110 for distribution to various subscribers, e.g., for live content, such as news programming, sporting events, and the like. Television servers 112 may also include advertising server(s) to store a number of advertisements that can be selected for presentation to viewers, e.g., in the home network 160 and at other downstream viewing locations. For example, advertisers may upload various advertising content to the core network 110 to be distributed to various viewers. Television servers 112 may also include interactive TV/video-on-demand (VOD) server(s), as described in greater detail below.

In one example, the access network 120 may comprise a Digital Subscriber Line (DSL) network, a broadband cable access network, a Local Area Network (LAN), a cellular or wireless access network, a $3^{rd}$ party network, and the like. For example, the operator of core network 110 may provide a cable television service, an IPTV service, or any other type of television service to subscribers via access network 120. In this regard, access network 120 may include a node 122, e.g., a mini-fiber node (MFN), a video-ready access device (VRAD) or the like. However, in another example, node 122 may be omitted, e.g., for fiber-to-the-premises (FTTP) installations. Access network 120 may also transmit and receive communications between home network 160 and core network 110 relating to voice telephone calls, communications with web servers via other networks 140, content distribution network (CDN) 170 and/or the Internet in general, and so forth. In another example, access network 120 may be operated by a different entity from core network 110, e.g., an Internet service provider (ISP) network.

Alternatively, or in addition, the network 100 may provide television and/or other data services to home network 160 via satellite broadcast. For instance, ground station 130 may receive television content from television servers 112 for uplink transmission to satellite 135. Accordingly, satellite 135 may receive television content from ground station 130 and may broadcast the television content to satellite receiver 139, e.g., a satellite link terrestrial antenna (including satellite dishes and antennas for downlink communications, or for both downlink and uplink communications), as well as to satellite receivers of other subscribers within a coverage area of satellite 135. In one example, satellite 135 may be controlled and/or operated by a same network service provider as the core network 110. In another example, satellite 135 may be controlled and/or operated by a different entity and may carry television broadcast signals on behalf of the core network 110.

As illustrated in FIG. 1, core network 110 may include various application servers 114. For instance, application servers 114 may be implemented to provide certain functions or features, e.g., a Serving-Call Session Control Function (S-CSCF), a Proxy-Call Session Control Function (P-CSCF), or an Interrogating-Call Session Control Function (I-CSCF), one or more billing servers for billing one or more services, including cellular data and telephony services, wire-line phone services, Internet access services, and television services. Application servers 114 may also include a Home Subscriber Server/Home Location Register (HSS/HLR) for tracking cellular subscriber device location and other functions. An HSS refers to a network element residing in the control plane of an IMS network that acts as a central repository of all customer specific authorizations, service profiles, preferences, etc. Application servers 114 may also include an IMS media server (MS) for handling and terminating media streams to provide services such as announcements, bridges, and Interactive Voice Response (IVR) messages for VoIP and cellular service applications. The MS may also interact with customers for media session management. In addition, application servers 114 may also include a presence server, e.g., for detecting a presence of a user. For example, the presence server may determine the physical location of a user or whether the user is "present" for the purpose of a subscribed service, e.g., online for a chatting service and the like.

Figure 6:
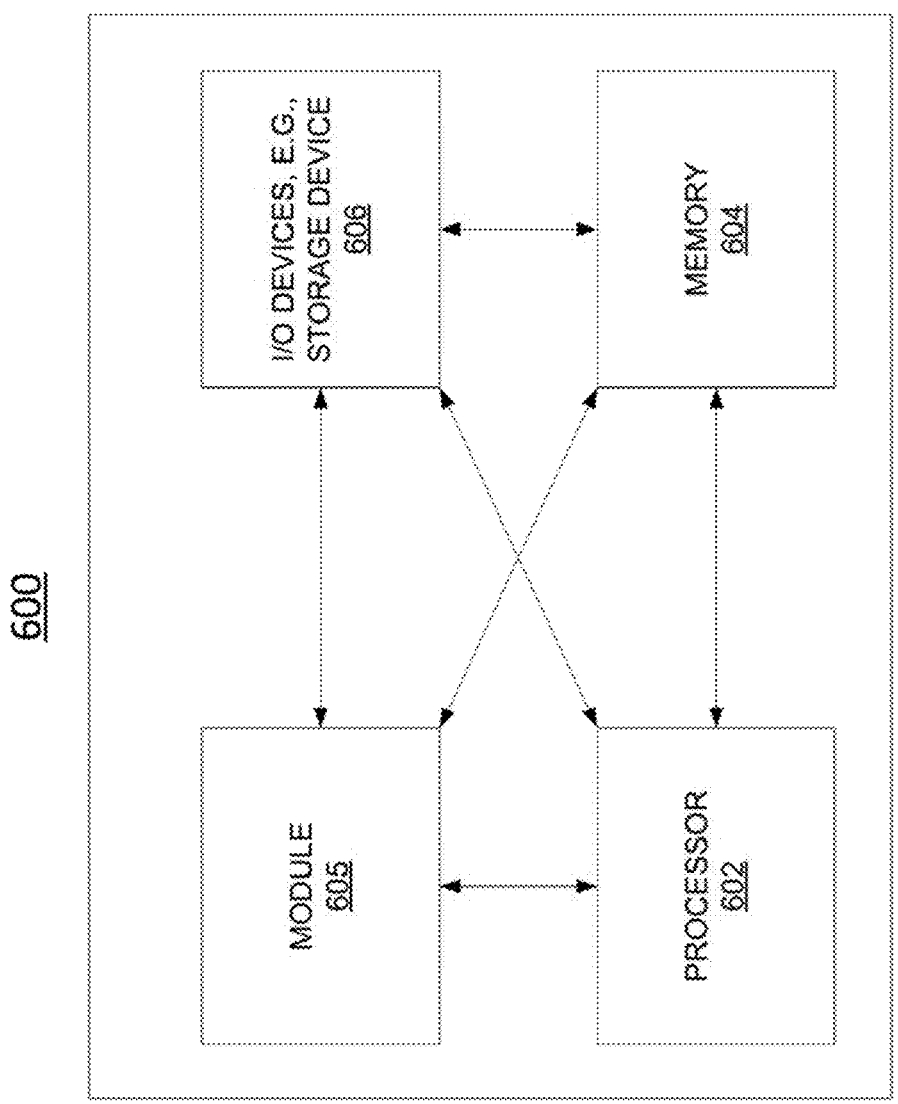
FIG. 6 illustrates a high level block diagram of a computing device specifically programmed to perform the steps, functions, blocks and/or operations described herein.

In one example, application servers 114 may include a latency guidance server. For instance, a latency guidance server may comprise a computing system or server, such as computing system 600 depicted in FIG. 6, and may be configured to provide one or more operations or functions for selecting a type of packet loss protection for a network-based communication based upon a latency estimate, for selecting a type of transmission for an immersive visual stream based upon a latency estimate, or for both. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 6 and discussed below) or multiple computing devices collectively configured to perform various steps, functions, and/or operations in accordance with the present disclosure. It should be noted that the foregoing are only several examples of the types of relevant application servers 114 that may be included in core network 110 for storing information relevant to providing various services to subscribers.

In accordance with the present disclosure, other networks 140 and servers 149 may comprise networks and devices of various media providers. For example, servers 149 may store and provide media content, such as video data, audio data, gaming data, and so forth to various client devices, such as one or more of mobile devices 157A, 157B, 159, 167A, 167B, 169, and/or PC 166, via other networks 140, core network 110, access network 120, wireless access network 150, CDN 140, and so forth. In addition, any one or more of servers 149 may comprise a computing system or server, such as computing system 600 depicted in FIG. 6, and may be configured to provide one or more operations or functions for selecting a type of packet loss protection for a network-based communication based upon a latency estimate, for selecting a type of transmission for an immersive visual stream based upon a latency estimate, or for both.

In one example, home network 160 may include a home gateway 161, which receives data/communications associated with different types of media, e.g., television, phone, and Internet, and separates these communications for the appropriate devices. The data/communications may be received via access network 120 and/or via satellite receiver 139, for instance. In one example, television data is forwarded to set-top boxes (STBs)/digital video recorders (DVRs) 162A and 162B to be decoded, recorded, and/or forwarded to television (TV) 163A and TV 163B for presentation. Similarly, telephone data is sent to and received from home phone 164; Internet communications are sent to and received from router 165, which may be capable of both wired and/or wireless communication. In turn, router 165 receives data from and sends data to the appropriate devices, e.g., personal computer (PC) 166, mobile devices 167A, 167B, and 169, and so forth. In one example, router 165 may further communicate with TV (broadly a display) 163A and/or 163B, e.g., where one or both of the televisions is a smart TV. In one example, router 165 may comprise a wired Ethernet router and/or an Institute for Electrical and Electronics Engineers (IEEE) 802.11 (Wi-Fi) router, and may communicate with respective devices in home network 160 via wired and/or wireless connections.

In one example, one or both of the STB/DVR 162A and STB/DVR 162B may comprise a computing system or server, such as computing system 600 depicted in FIG. 6, and may be configured to provide one or more operations or functions for selecting a type of packet loss protection for a network-based communication based upon a latency estimate. Among other functions, STB/DVR 162A and STB/DVR 162B may comprise video players capable of playing video programs in formats such as Moving Picture Expert Group (MPEG) .mpeg files, .mov files, .mp4 files, .3gp files, .f4f files, .m3u8 files, or the like. Although STB/DVR 162A and STB/DVR 162B are illustrated and described as integrated devices with both STB and DVR functions, in other, further, and different examples, STB/DVR 162A and/or STB/DVR 162B may comprise separate STB and DVR devices.

Figure 4:
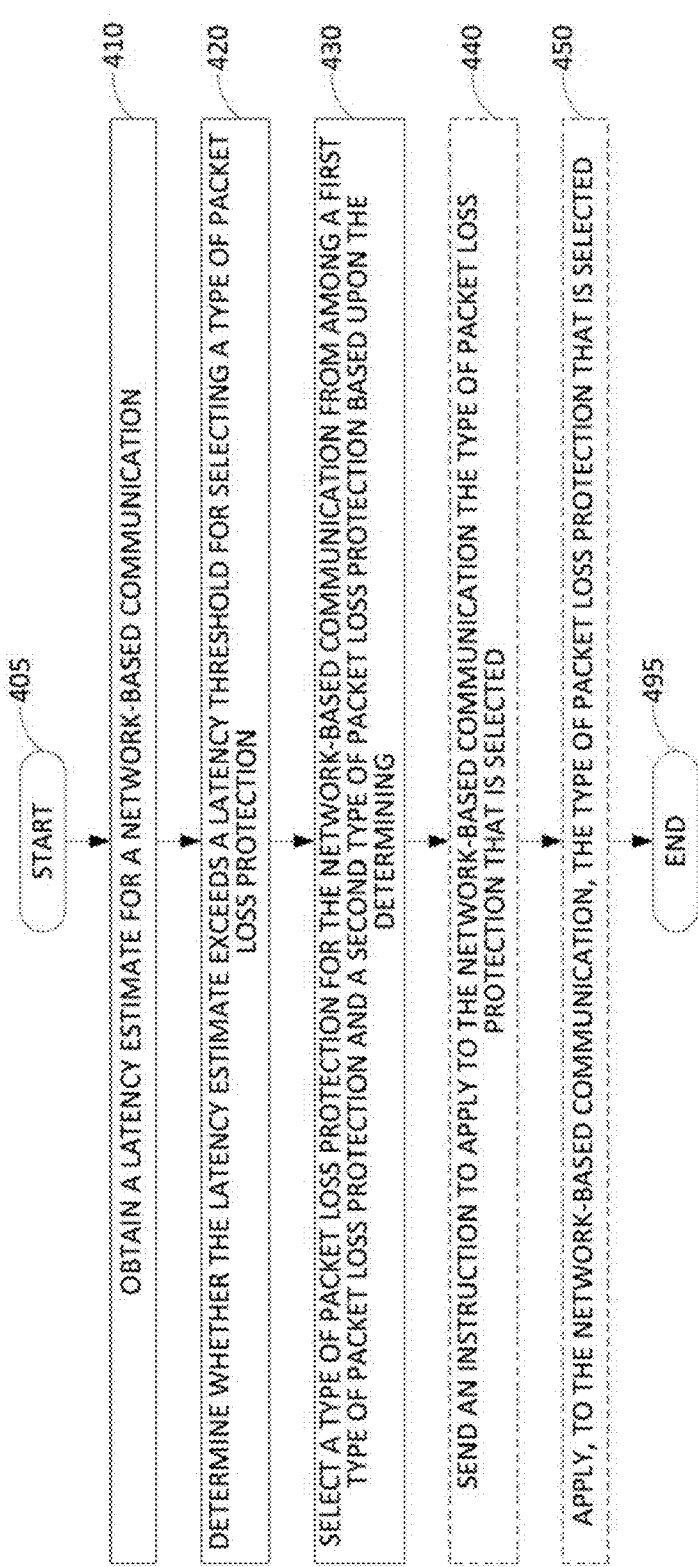
FIG. 4 illustrates a flowchart of an example method for selecting a type of packet loss protection for a network-based communication based upon a latency estimate, in accordance with the present disclosure.
Figure 5:
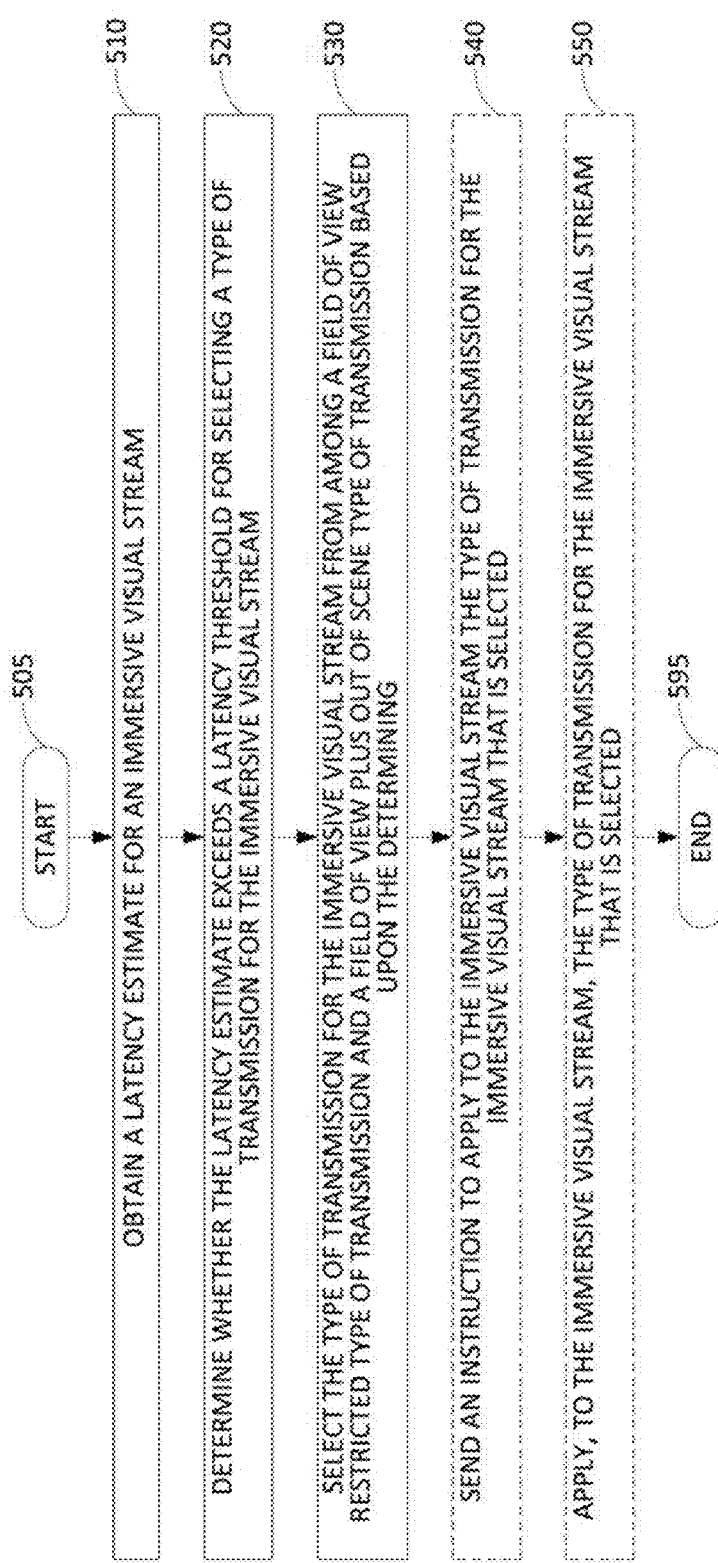
FIG. 5 illustrates a flowchart of an example method for selecting a type of transmission for an immersive visual stream based upon a latency estimate, in accordance with the present disclosure.

In addition, one or more of mobile devices 157A, 157B, 159, 167A, 167B, 169, and/or PC 166 may also comprise a computing system, such as computing system 600 depicted in FIG. 6, and may be configured to provide one or more operations or functions for selecting a type of packet loss protection for a network-based communication based upon a latency estimate, for selecting a type of transmission for an immersive visual stream based upon a latency estimate, or for both. A flowchart of an example method of selecting a type of packet loss protection for a network-based communication based upon a latency estimate is illustrated in FIG. 4 and described in greater detail below. A flowchart of an example method of selecting a type of transmission for an immersive visual stream based upon a latency estimate is illustrated in FIG. 5 and described in greater detail below.

Network 100 may also include a content distribution network (CDN) 170. In one example, CDN 170 may be operated by a different entity from core network 110. In another example, CDN 170 may be operated by a same entity as core network 110, e.g., a telecommunication service provider. In one example, the CDN 170 may comprise a collection of cache servers distributed across a large geographical area and organized in a tier structure. The first tier may comprise a group of servers that access content web servers (origin servers) to pull content into the CDN 170, referred to as ingest servers, e.g., ingest server 172. The content may include video programs, content of various webpages, electronic documents, video games, etc. A last tier may comprise cache servers which deliver content to end user, referred to as edge caches, or edge servers, e.g., edge server 174. For ease of illustration, a single ingest server 172 and a single edge server 174 are shown in FIG. 1. In between the ingest server 172 and edge server 174, there may be several layers of servers (omitted from the illustrations), referred to as the middle tier. In one example, the edge server 174 may be multi-tenant, serving multiple content providers, such as core network 110, content providers associated with server(s) 149 in other network(s) 140, and so forth. In addition, in one example, edge server 174 may comprise a computing system or server, such as computing system 600 depicted in FIG. 6, and may be configured to provide one or more operations or functions for selecting a type of packet loss protection for a network-based communication based upon a latency estimate, for selecting a type of transmission for an immersive visual stream based upon a latency estimate, or for both.

As mentioned above, TV servers 112 in core network 110 may also include one or more interactive TV/video-on-demand (VOD) servers. In one example, an interactive TV/VOD server may comprise a computing system or server, such as computing system 600 depicted in FIG. 6, and may be configured to provide one or more operations or functions for selecting a type of packet loss protection for a network-based communication based upon a latency estimate, for selecting a type of transmission for an immersive visual stream based upon a latency estimate, or for both. Among other things, an interactive TV/VOD server may function as a server for STB/DVR 162A and/or STB/DVR 162B, one or more of mobile devices 157A, 157B, 159, 167A, 167B, 169, and/or PC 166 operating as a client for requesting and receiving videos or other immersive visual streams (e.g., 360 video, 3D video, volumetric video, etc.) as described herein.

Further details regarding the functions that may be implemented by edge server 174, STBs/DVRs 162A and 162B, mobile devices 157A, 157B, 159, 167A, 167B, and 169, and/or PC 166 are discussed in greater detail below in connection with the examples of FIGS. 2-5. In addition, it should be realized that the network 100 may be implemented in a different form than that which is illustrated in FIG. 1, or may be expanded by including additional endpoint devices, access networks, network elements, application servers, etc. without altering the scope of the present disclosure. For example, core network 110 is not limited to an IMS network. Wireless access network 150 is not limited to a UMTS/UTRAN configuration. Similarly, the present disclosure is not limited to an IP/MPLS network for VoIP telephony services, or any particular type of broadcast television network for providing television services, and so forth.

FIG. 2 illustrates an example system 200 according to the present disclosure. As illustrated in FIG. 2, the system 200 includes Internet 230, and networks 220A and 220B. For illustrative purposes, the Internet 230 may comprise any one or more interconnected networks, such as transport networks, core networks, metro network, etc., of one or more telecommunication service providers. Internet 230 may also include one or more content distribution networks (CDNs), public or private cloud computing infrastructure, and so forth. In the example of FIG. 2, access networks 220A and 220B may comprise broadband optical and/or cable access networks, Local Area Networks (LANs), wireless access networks (e.g., an IEEE 802.11/Wi-Fi network and the like), cellular access networks, Digital Subscriber Line (DSL) networks, public switched telephone network (PSTN) access networks, 3$^{rd}$ party networks, and the like. In one example, the access networks 220A and 220B may comprise different types of access networks or may comprise the same type of access network. The access networks 220A and 220B may be operated by different service providers, the same service provider, or a combination thereof, or may be operated by entities having core businesses that are not related to telecommunications services, e.g., corporate, governmental or educational institution LANs, and the like.

Access networks 220A and 220B may transmit and receive communications (broadly, "network-based communications") between client devices 210A and 210B, or between server 240 and client device 210A. Client devices 210A and 210B may each comprise a personal computer, a laptop computer, a set-top box, a mobile computing device, e.g., a cellular smartphone, a wearable computing device (e.g., smart glasses, augmented reality glasses, or a VR and/or AR headset for presenting 360 video, 3D video, volumetric video or similar visual content, including visual streams for 3D gaming or other types of delay-sensitive network-based visual applications, such as for remote surgery, remote teaching, and so forth), a telephone, a wireless speaker and/or smart speaker, a digital voice assistant device, and so forth. The client devices 210A and 210B may correspond to similar components of FIG. 1, such as STB/DVR 162A and/or STB/DVR 162B, one or more of mobile devices 157A, 157B, 159, 167A, 167B, 169, and/or PC 166. In addition, server 240 may correspond to components of FIG. 1 including TV servers 112, servers 149, edge server 174 and so forth, which may comprise servers for delivering network-based communication, including immersive visual streams, to client devices.

As illustrated in FIG. 2, the system 200 further includes latency guidance servers 250A and 250B which may correspond to devices in FIG. 1, such as application servers 114, servers 149, etc. In accordance with the present disclosure, latency guidance servers 250A and 250B may collect various types of network data from core networks, radio access networks (RANs), and so forth, and may utilize the collected data to estimate/predict the network latency for a network-based communication. In one example, delay over Internet 230 may be assumed to be fairly static (e.g., a fixed value or within a defined range) whereas access networks 220A and 220B may have delays which are more variable (in particular, in examples where access networks 220A and 220B may comprise wireless access networks). Thus, in one example, the delay/latency in access networks 220A and 220B may be measured and predicted in order to be added with the delay/latency over Internet 230 in order to provide delay/latency guidance for a network-based communications via the system 200.

To illustrate, core latency (latency of Internet 230) for cellular communications is relatively deterministic, and may be related to the distance between a client device and the network controller. Provided with the client/user equipment (UE) location, which can be inferred with cell location, and the according network controller, the distance may be known, as well as the core latency. The more dynamic part of the end-to-end latency is RAN latency. Cellular base stations, such as eNBs, provides rich information and performance indicators (e.g., key performance indicators (KPIs)) including physical resource block (PRB) utilization, queue length, reference signal received power (RSRP), reference signal received quality (RSRQ), and so forth that may be used to predict RAN latency. For instance, in one example, an artificial intelligence/machine learning (AI/ML) algorithm may be applied to the collected network data to predict near future latency for individual client devices, network-based communications, and/or applications.

In one illustrative example, client device 210A may be engaged in a network-based communication with server 240, e.g., obtaining a visual stream and/or other media for a cloud-based video game, indicated by session 260A. In this case, the end-to-end delay, or latency, includes delay in Internet 230, which as discussed above may be relatively fixed, and the delay in network 220A, e.g., a cellular access network. Continuing with the present example, latency guidance server 250A may collect network measurements as described above from one or more components of network 220A and may calculate an anticipated latency for network 220A. The delay/latency of network 220A may be added to the relatively fixed delay/latency of Internet 230, and the predicted end-to-end latency may be provided to and/or obtained by client device 210A. In one example, the end-to-end latency may be requested by client device 210A (e.g., via a RESTFUL network application programming interface (API)) and provided by latency guidance server 250A in response to the request. Alternatively, or in addition, latency guidance server 250A may periodically provide the end-to-end latency predictions to client device 210A.

Client device 210A may then select a type of packet loss protection for a network-based communication based upon a latency estimate. For instance, if the latency prediction is low (e.g., below a threshold, such as under 200 ms for VR or 3D video streaming, under 100 ms, under 300 ms, etc.), a retransmission-based scheme may be selected. Otherwise, FEC (e.g., application layer FEC, transport layer FEC, etc.) may be selected. In this regard, it should be noted that various transport layer protocols may be utilized, such as Transmission Control Protocol (TCP) or Reliable Uniform Datagram Protocol (RUDP) for retransmission-based protection, Uniform Datagram Protocol (UDP) or Real-Time Protocol (RTP) for FEC-based protection, and so forth. In one example, client device 210A may instruct or request server 240 to apply the type of packet loss protection scheme that is selected. For instance, using reliable transport, client device 210A may send response packets indicating that one or more packets in a sequence of the network-based communication from server 240 have been received. As such, client device 210A may include a flag or other informational indicators in a header of the response packet indicating the type of packet loss protection to be utilized, and/or indicating a change in the type of packet loss protection. Alternatively, or in addition, client device 210A may send a separate packet or other communications (e.g., a datagram, a sequence of packets, etc.) to server 240 indicating when a change in packet loss protection scheme is to be applied.

The foregoing describes an example where the type of packet loss protection is selected by the client device 210A. However, in another example, the type of packet loss protection may be selected by server 240. For instance, server 240 may similarly obtain end-to-end latency estimates for session 260A from latency guidance server 250A and may similarly select the type of packet loss protection based upon the same criteria as described above, e.g., above or below a threshold, such as 200 ms. In such an example, server 240 may provide an indication to client device 210A of the current type of packet loss protection to use and/or change in the type of packet loss protection, when such a change is selected. The notification may be in-band, e.g., in one or more packet headers comprising the network-based communication of session 260A, or out-of-band, e.g., via a different network path and/or different session, via one or more packets or other datagrams that do not convey user data (audio, video, etc.), and so forth. In addition, it should also be noted that in other, further, and different examples, different types of packet loss protection, such as ARQ, HARQ, and so forth, may be similarly considered and selected in accordance with one or more latency thresholds based upon the end-to-end latency prediction.

As another example, client devices 210A and 210B may be engaged in a network-based communication comprising a conference call (e.g., audio only, or a video call). In such case, the session 260B may include the Internet 230 as well as both networks 220A and 220B. In this example, there may be two different providers of networks 220A and 220B (e.g., one or both of which may comprise cellular access networks). In addition, each of the respective providers may maintain its own latency guidance server, 250A and 250B, respectively. As such, the end-to-end latency may involve predictions for both networks 220A and 220B by both of latency guidance servers 250A and 250B. For example, latency guidance server 250A may collect network measurements as described above from one or more components of network 220A and may calculate an anticipated latency for network 220A. Similarly, latency guidance server 250B may collect network measurements as described above from one or more components of network 220B and may calculate an anticipated latency for network 220B.

In the present example, the predicted delay/latency of network 220A and the predicted delay/latency of network 220B may be added to the relatively fixed delay/latency of Internet 230 to determine the predicted end-to-end latency. In one example, client device 210A may obtain the predicted delay/latency of network 220A and the predicted delay/latency of network 220B for latency guidance servers 250A and 250B, respectively, and may add the relatively fixed delay of Internet 230 to calculate the predicted end-to-end delay. In another example, the latency guidance servers 250A and 250B may exchange latency estimates/predictions for networks 220A and 220B, and either or both of the latency guidance servers 250A and 250B may determine the predicted/estimated end-to-end delay by adding the predicted latencies of networks 220A and 220B, and the relatively fixed latency of Internet 230. As such, either or both of latency guidance servers 250A and 250B may then provide the end-to-end latency estimate to one or both of client devices 210A and 210B, e.g., upon request and/or periodically.

In addition, either or both of client devices 210A and 210B may then select a type of packet loss protection in accordance with the end-to-end delay estimate as described above. For instance, the client device that is the caller may be designated to select the type of packet loss protection. In another example, the other client device may be designated to select the type of packet loss protection. In another example, the client devices 210A and 210B may be configured to select the type of packet loss protection for inbound packets. For instance, the delays may be not be reciprocal delays, but may be different for different directions. For example, client device 210B may be assigned more than sufficient downlink bandwidth, but may be allocated insufficient uplink bandwidth to support the same data rate as the downlink. In still another example, either or both of latency guidance servers 250A and 250B may be included in signaling paths for the session 260B such that latency guidance server 250A and/or latency guidance server 250B may select a type of packet loss protection in accordance with the predicted/estimated end-to-end delay, and then may instruct the client devices 210A and 210B to implement the type of packet loss protection that is selected. Thus, these and other modifications may be implemented in additional examples of the present disclosure.

The foregoing examples described in connection with FIG. 2 relate to selecting a type of packet loss protection for a network-based communication based upon a latency estimate. However, examples of the present disclosure may alternatively or additionally include selecting a type of transmission for an immersive visual stream based upon a latency estimate. For instance, the network-based communication of session 260A may comprise transmission of an immersive visual stream from server 240 to client device 210A, such as an AR or VR stream, a 360 video, 3D video, and/or volumetric video stream, etc. Similarly, session 260B may comprise an AR or VR interaction between client devices 210A and 210B. As described above, client device 210A, client device 210B, and/or server 240 may obtain end-to-end latency estimates from either or both of latency guidance servers 250A and 250B or may obtain latency estimates for networks 220A or 220B, respectively, and may calculate an end-to-end latency therefrom.

In any case, the end-to-end latency estimate may be used to select a type of packet loss protection. However, the end-to-end latency estimate may alternatively or additionally be used to select a type of transmission, e.g., where session 260A and/or 260B comprises an immersive visual stream. To illustrate, transmission of an immersive visual stream may be from server 240 to client device 210A. An example frame 300 of an immersive visual stream is illustrated in FIG. 3. The frame 300 includes a plurality of rectangular tiles 350. As illustrated in FIG. 3, the frame 300 includes a field of view (FoV) area 320. A central portion 310 of the FoV area 320 is indicated as labeled. Similarly, a peripheral portion 330 of the FoV area 320 is also indicated as labeled. Regions 340 outside of FoV area 320 (e.g., comprising a plurality of rectangular tiles) are also illustrated in FIG. 3. In one example, a client device, such as client device 210A of FIG. 2, may determine a FoV based upon one or more sensors, such as a gyroscope and compass, a global positioning system (GPS), or the like, via eye and/or gaze tracking, based upon distance estimates to one or more AR markers via a device camera, and so forth.

As described above, if the predicted end-to-end latency is lower than a certain threshold (e.g., 20 ms, 40 ms, etc.), a more aggressive video transmission scheme may be selected. For example, in this scenario, only visual data for the predicted FoV area 320 is transmitted by the server 240. When the FoV prediction is wrong, the client device 210A may retrieve the visual data for the actual FoV area from the server 240. Since latency is low (e.g., less than 20 ms, less than 40 ms, etc.), it is expected these bytes can be received before any QoE degradation can be observed.

On the other hand, if the predicted end-to-end latency is higher than a certain threshold (e.g., 20 ms), a more conservative video transmission scheme may be selected. For example, in this scenario, an image of 360 degree video, volumetric video, or the like can be encoded into two-tiers (or layers with layered video), where the FoV area 320 is encoded and/or transmitted by the server 240 with higher visual quality, while non-FoV areas (e.g., regions 340, and the remaining tiles 350 outside of FoV area 320, which may be referred to as "out-of-scene" (OOS) tiles), are encoded and/or transmitted with lower visual quality. In addition, when the predicted end-to-end latency is high, low quality video of the non-FoV areas is used to provide basic visual quality when the actual FoV area 320 has not been received. Although data regarding the actual FoV area 320 may be requested from the server 240, it is assumed that this information will not reach the client device 210A by the display deadline.

A similar process for selecting a type of transmission for an immersive visual stream between client device 210A and client device 210B for session 260B may be adopted in accordance with the foregoing. In addition, it should be noted that variations of the foregoing may also be applied. For instance, when selecting a FoV restricted type of transmission, server 240 may still differentiate visual quality for tiles in the central portion 310 of the FoV area 320 and tiles in the peripheral portion 330 of the FoV area 320 (e.g., higher visual quality in central portion 310, lower visual quality in the peripheral portion 330). Similarly, when selecting for tiered or layered transmission, the server 240 may implement three or more visual qualities, e.g., a highest visual quality for the central portion 310, a second highest visual quality for the peripheral portion 330, a third visual quality for the regions 340, a fourth visual quality for remaining tiles 350 in frame 300, and so forth. Thus, these and other modifications may be implemented in additional examples of the present disclosure.

FIG. 4 illustrates a flowchart of a method 400 for selecting a type of packet loss protection for a network-based communication based upon a latency estimate, in accordance with the present disclosure. In one example, the method 400 is performed by a component of the network 100 of FIG. 1, such as by one of application servers 114, servers 149, mobile devices 157A, 157B, 159, 167A, 167B, or 169, home network devices, such as STBs 162A and 162B, TV 163A and TV 163B, home phone 164, PC 166, and so forth, and/or any one or more components thereof (e.g., a processor, or processors, performing operations stored in and loaded from a memory), or by a plurality of such devices in conjunction with one another, and so on. Similarly, the method 400 may be performed by a component of the system 200 of FIG. 2, such as client device 210A, client device 210B, server 240, latency guidance server 250A, or latency guidance server 250B, and/or any one or more components thereof (e.g., a processor, or processors, performing operations stored in and loaded from a memory), or by a plurality of such devices in conjunction with one another, and so on. In one example, the steps, functions, or operations of method 400 may be performed by a computing device or system 600, and/or processor 602 as described in connection with FIG. 6 below. For instance, the computing device or system 600 may represent any one or more components of one or more components of the network 100 of FIG. 1 and/or the system 200 of FIG. 2 that is/are configured to perform the steps, functions and/or operations of the method 400. Similarly, in one example, the steps, functions, or operations of method 400 may be performed by a processing system comprising one or more computing devices collectively configured to perform various steps, functions, and/or operations of the method 400. For instance, multiple instances of the computing device or processing system 600 may collectively function as a processing system. For illustrative purposes, the method 400 is described in greater detail below in connection with an example performed by a processing system. The method 400 begins in step 405 and proceeds to step 410.

At step 410, the processing system obtains a latency estimate for a network-based communication. The network-based communication may comprise, for example, at least one of visual data or audio data. For instance, video calls, voice calls, conference calls, VR and AR streams, 3D video, volumetric video, video gaming streams, and so forth may include visual data (e.g., video, animated graphics, etc.), audio data, or both. The network-based communication may alternatively or additionally comprise any high data volume and/or delay-sensitive data streams, such as information feeds for stock trading, premises security, machine learning/artificial intelligence data processing applications, transportation system management, and so forth.

In one example, step 410 may include calculating the latency estimate/prediction for the network-based communication. For instance, in examples where the network-based communication traverses at least one radio access network (RAN), the processing system may obtain performance indicators such as physical PRB utilization, queue length, RSRP, RSRQ, and so forth to predict RAN latency. Similar performance indicators may be obtained for additional types of access network(s) as well as core and/or metro network (s), backbone network(s), transport network(s), satellite downlink(s), wireless and or wired local area networks (LANs) wireless wide area network(s) (WWAN(s)), and so forth that may be part of a transmission path for the network-based communication. In examples where there may be more than one network service provider infrastructure involved in the conveyance of packets or other protocol data units of the network-based communication, step 410 may include obtaining the performance indicators from the different network service provider infrastructure according to an arrangement with the respective network service provider(s). In one example, an artificial intelligence/machine learning (AI/ML) algorithm may be applied to the collected performance indictors to predict near future latency. In addition, in one example, for portions of the network(s) over which the network-based communication is conveyed for which there is no network performance measures or latency estimates that are obtainable, a relatively fixed latency measure may be included in calculating the overall/end-to-end latency estimate. For instance, Internet latency may be assumed to be relatively fixed, or within a narrow range, and may primarily be a function of network distance between the participant devices.

At step 420, the processing system determines whether the latency estimate exceeds a latency threshold for selecting a type of packet loss protection. The threshold may comprise, for example, 200 ms for VR or 3D video streaming, under 100 ms, under 300 ms, etc.

At step 430, the processing system selects a type of packet loss protection for the network-based communication from among a first type of packet loss protection and a second type of packet loss protection based upon the determining. In particular, when the latency estimate is determined at step 420 to not exceed the latency threshold, the first type of packet loss protection is selected, and when the latency estimate is determined at step 420 to exceed the threshold, the second type of packet loss protection is selected. For instance, in one example, the first type of pack loss protection may comprise a packet retransmission scheme and the second type of packet loss protection may comprise an error correcting code, e.g., a forward error correction (FEC) scheme. In other examples, the second type of packet loss protection may comprise an ARQ or HARQ scheme, a redundant stream scheme (e.g., with different network paths, and in one example, with time offset), and so forth.

At optional step 440, the processing system may send an instruction to apply to the network-based communication the type of packet loss protection that is selected. In one example, the processing system comprises at least one device that is a participant of the network-based communication. For instance, the instruction may be sent to a server or endpoint device that is transmitting data packets of the network-based communication. For example, the processing system may comprise the receiver of the network-based communication or may comprise a centralized network-based processing system that is coordinating the network-based communication (e.g., an application server, a latency guidance server, etc.). In the case of a centralized network-based processing system, the instruction may be sent to one or both participant devices of the network-based communication (or to multiple participant devices, such as for a conference call, a multi-player online video game, etc.). For example, the instruction may pertain to the network-based communication between two of the participant devices or apply from a server to multiple client devices, e.g., if the client devices are in relatively close network proximity and therefore can be estimated to have the same network latency with the server, or other participants in a group call, and so forth. In one example, optional step 440 may be performed when there is a change in the type of packet loss protection that is selected, e.g., due to a changing network latency estimate crossing the threshold as compared to a previous estimate.

At optional step 450, the processing system may apply, to the network-based communication, the type of packet loss protection that is selected. For example, the processing system may include one or both endpoints (or multiple endpoints) of the network-based communication. Thus, for a FEC packet loss protection scheme, the processing system may transmit FEC packets and/or may be configured to receive FEC packets and to recreate any lost packets in accordance with information in the FEC packets, and so forth. Similarly, for a retransmission-based scheme, the processing system may transmit packets without FEC and/or may be configured to receive packets without FEC, to request retransmission for lost packets, etc.

Following step 430, or one of the optional steps 440 or 450, the method 400 proceeds to step 495 where the method ends.

It should be noted that the method 400 may be expanded to include additional steps, or may be modified to replace steps with different steps, to combine steps, to omit steps, to perform steps in a different order, and so forth. For instance, in one example the processor may repeat one or more steps of the method 400, such as steps 410-430, steps 410-440, etc., such as for additional estimates of network latency for future time periods, and so on. In another example, the method 400 may include selecting the level of packet loss protection for when FEC is selected. For instance, FEC can be set to cover 4% packet loss, 5% packet loss, etc., where up to 4% of packets, 5% of packets, etc. can be lost and the receiver is still able to recover all packets. If there is greater packet loss, some packets may not be recoverable. However, if there is less packet loss than the level that is selected, some FEC packets are extraneous and may result in bandwidth waste. In another example, the method 400 may include selecting the threshold. For instance, the threshold may be different for different applications, which may have different delay/latency tolerances. In still another example, the method 400 may be expanded to include operations of the method 500 below, e.g., for network-based communications comprising immersive visual streams. Thus, these and other modifications are all contemplated within the scope of the present disclosure.

FIG. 5 illustrates a flowchart of a method 500 for selecting a type of transmission for an immersive visual stream based upon a latency estimate, in accordance with the present disclosure. In one example, the method 500 is performed by a component of the network 100 of FIG. 1, such as by one of application servers 114, servers 149, mobile devices 157A, 157B, 159, 167A, 167B, or 169, home network devices, such as STBs 162A and 162B, TV 163A and TV 163B, home phone 164, PC 166, and so forth, and/or any one or more components thereof (e.g., a processor, or processors, performing operations stored in and loaded from a memory), or by a plurality of such devices in conjunction with one another, and so on. Similarly, the method 500 may be performed by a component of the system 200 of FIG. 2, such as client device 210A, client device 210B, server 240, latency guidance server 250A, or latency guidance server 250B, and/or any one or more components thereof (e.g., a processor, or processors, performing operations stored in and loaded from a memory), or by a plurality of such devices in conjunction with one another, and so on. In one example, the steps, functions, or operations of method 500 may be performed by a computing device or system 600, and/or processor 602 as described in connection with FIG. 6 below.

For instance, the computing device or system 600 may represent any one or more components of one or more components of the network 100 of FIG. 1 and/or the system 200 of FIG. 2 that is/are configured to perform the steps, functions and/or operations of the method 500. Similarly, in one example, the steps, functions, or operations of method 500 may be performed by a processing system comprising one or more computing devices collectively configured to perform various steps, functions, and/or operations of the method 500. For instance, multiple instances of the computing device or processing system 600 may collectively function as a processing system. For illustrative purposes, the method 500 is described in greater detail below in connection with an example performed by a processing system. The method 500 begins in step 505 and proceeds to step 510.

At step 510, the processing system obtains a latency estimate for an immersive visual stream. For instance, the immersive visual stream may comprise data for rendering at least one of: 3D visual content (e.g., including video and non-video, such as exploratory 3D models of building, environments, ships, aircraft, biological systems, etc.), virtual reality content, augmented reality content, or volumetric video content.

At step 520, the processing system determines whether the latency estimate exceeds a latency threshold for selecting a type of transmission for the immersive visual stream. The immersive visual stream may be delay/latency sensitive, such as for a video call, gaming, live streaming, etc. For instance, the latency threshold may be 20 ms for 4K video streams, 40 ms for visual qualities less than 4K, 100 ms for animated visual streams, etc.

At step 530, the processing system selects the type of transmission for the immersive visual stream from among a field of view restricted type of transmission and a field of view plus out of scene type of transmission based upon the determining. For instance, when the latency estimate is determined to not exceed the latency threshold, the field of view restricted type of transmission is selected, and wherein when the latency estimate is determined to exceed the threshold, the field of view plus out of scene type of transmission is selected. In one example, the field of view restricted type of transmission includes visual information for regions within the field of view of a user and does not include visual information for regions outside of the field of view of the user. In addition, in one example, the field of view plus out of scene type of transmission includes first visual information for regions within the field of view of a user and second visual information for regions outside of the field of view of the user. For instance, the first visual information may comprise a higher visual quality than the second visual information, e.g., from a higher quality track of the same video or other visual content. In another example, the first visual information may comprise at least one additional layer of a layered video as compared to a number of layers for the second visual information.

At optional step 540, the processing system may send an instruction to apply to the immersive visual stream the type of transmission for the immersive visual stream that is selected. For instance, the processing system may comprise a centralized and/or network-based controller sending instructions to a client or server of the immersive visual stream (or to two participant device/endpoints for applications with interactive visual streams, such as 3D remote collaboration, gaming, etc.). In another example, the processing system may comprise a participant device (e.g., a recipient device) sending the instruction to another participant device (e.g., a server/transmitter) to apply the type of transmission. In one example, optional step 540 may be performed when there is a change in the type of transmission for the immersive visual stream that is selected, e.g., due to a changing network latency estimate crossing the threshold as compared to a previous estimate.

At optional step 550, the processing system may apply, to the immersive visual stream, the type of transmission for the immersive visual stream that is selected. For example, the processing system may comprise a transmitting participant device that applies the type of transmission that is selected at step 530.

Following step 530, or one of the optional steps 540 or 550, the method 500 proceeds to step 595 where the method ends.

It should be noted that the method 500 may be expanded to include additional steps, or may be modified to replace steps with different steps, to combine steps, to omit steps, to perform steps in a different order, and so forth. For instance, in one example the processor may repeat one or more steps of the method 500, such as steps 510-530, steps 510-540, etc. In another example, the method 500 may include selecting the latency threshold. For instance, the threshold may be different for different applications, which may have different delay/latency tolerances. For example, certain applications may use a longer buffer, such a "live" video streaming, which may actually be transmitted and/or received with a several second delay, or the like, whereas video calls may use a shallow buffer or no buffer. In still another example, the method 500 may be expanded to include operations of the method 400 above, e.g., to include both packet loss protection adaptation and type of transmission adaptation based upon latency guidance. Thus, these and other modifications are all contemplated within the scope of the present disclosure.

In addition, although not expressly specified above, one or more steps of the method 400 or the method 500 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 4 or FIG. 5 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the example embodiments of the present disclosure.

FIG. 6 depicts a high-level block diagram of a computing device or processing system specifically programmed to perform the functions described herein. For example, any one or more components or devices illustrated in FIG. 1 or FIG. 2, or described in connection with the method 400 of FIG. 4 or the method 500 of FIG. 5 may be implemented as the processing system 600. As depicted in FIG. 6, the processing system 600 comprises one or more hardware processor elements 602 (e.g., a microprocessor, a central processing unit (CPU) and the like), a memory 604, (e.g., random access memory (RAM), read only memory (ROM), a disk drive, an optical drive, a magnetic drive, and/or a Universal Serial Bus (USB) drive), a module 605 for selecting a type of packet loss protection for a network-based communication based upon a latency estimate and/or for selecting a type of transmission for an immersive visual stream based upon a latency estimate, and various input/output devices 606, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 602 can also be configured or programmed to cause other devices to perform one or more operations as discussed above. In other words, the hardware processor 602 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 605 for selecting a type of packet loss protection for a network-based communication based upon a latency estimate and/or for selecting a type of transmission for an immersive visual stream based upon a latency estimate (e.g., a software program comprising computer-executable instructions) can be loaded into memory 604 and executed by hardware processor element 602 to implement the steps, functions or operations as discussed above in connection with the example method(s). Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 605 for selecting a type of packet loss protection for a network-based communication based upon a latency estimate and/or for selecting a type of transmission for an immersive visual stream based upon a latency estimate (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
obtaining, by a processing system including at least one processor, a latency estimate for a network-based communication;
determining, by the processing system, whether the latency estimate exceeds a latency threshold for selecting a type of packet loss protection; and
selecting, by the processing system, the type of packet loss protection for the network-based communication from among a first type of packet loss protection and a second type of packet loss protection based upon the determining, wherein when the latency estimate is determined to not exceed the latency threshold, the first type of packet loss protection is selected, and wherein when the latency estimate is determined to exceed the latency threshold, the second type of packet loss protection is selected, wherein the first type of pack loss protection comprises a packet retransmission scheme, and wherein the second type of packet loss protection comprises a redundant stream scheme with different network paths and a time offset.

2. The method of claim 1, further comprising:
sending an instruction to apply to the network-based communication the type of packet loss protection that is selected.

3. The method of claim 1, further comprising:
applying, to the network-based communication, the type of packet loss protection that is selected.

4. The method of claim 1, wherein the network-based communication comprises a stream of at least one of:
visual data; or
audio data.

5. The method of claim 1, wherein the processing system comprises a network-based processing system.

6. The method of claim 1, wherein the processing system comprises at least one device that is a participant of the network-based communication.

7. A device comprising:
a processor; and
a computer-readable medium storing instructions which, when executed by the processor, cause the processor to perform operations, the operations comprising:
obtaining a latency estimate for a network-based communication;
determining whether the latency estimate exceeds a latency threshold for selecting a type of packet loss protection; and selecting the type of packet loss protection for the network-based communication from among a first type of packet loss protection and a second type of packet loss protection based upon the determining, wherein when the latency estimate is determined to not exceed the latency threshold, the first type of packet loss protection is selected, and wherein when the latency estimate is determined to exceed the latency threshold, the second type of packet loss protection is selected, wherein the first type of pack loss protection comprises a packet retransmission scheme, and wherein the second type of packet loss protection comprises a redundant stream scheme with different network paths and a time offset.

8. A non-transitory computer-readable medium storing instructions which, when executed by a processing system including at least one processor, cause the processing system to perform operations, the operations comprising:
    obtaining a latency estimate for a network-based communication;
    determining whether the latency estimate exceeds a latency threshold for selecting a type of packet loss protection; and
    selecting the type of packet loss protection for the network-based communication from among a first type of packet loss protection and a second type of packet loss protection based upon the determining, wherein when the latency estimate is determined to not exceed the latency threshold, the first type of packet loss protection is selected, and wherein when the latency estimate is determined to exceed the latency threshold, the second type of packet loss protection is selected, wherein the first type of pack loss protection comprises a packet retransmission scheme, and wherein the second type of packet loss protection comprises a redundant stream scheme with different network paths and a time offset.

9. The non-transitory computer-readable medium of claim 8, wherein the operations further comprise:
    sending an instruction to apply to the network-based communication the type of packet loss protection that is selected.

10. The non-transitory computer-readable medium of claim 8, wherein the operations further comprise:
    applying, to the network-based communication, the type of packet loss protection that is selected.

11. The non-transitory computer-readable medium of claim 8, wherein the network-based communication comprises a stream of at least one of:
    visual data; or
    audio data.

12. The non-transitory computer-readable medium of claim 8, wherein the processing system comprises a network-based processing system.

13. The non-transitory computer-readable medium of claim 8, wherein the processing system comprises at least one device that is a participant of the network-based communication.

14. The device of claim 7, wherein the operations further comprise:
    sending an instruction to apply to the network-based communication the type of packet loss protection that is selected.

15. The device of claim 7, wherein the operations further comprise:
    applying, to the network-based communication, the type of packet loss protection that is selected.

16. The device of claim 7, wherein the network-based communication comprises a stream of at least one of:
    visual data; or
    audio data.

17. The device of claim 7, wherein the processor comprises a network-based processing system.

18. The device of claim 7, wherein the processor comprises at least one device that is a participant of the network-based communication.

* * * * *